(No Model.) 2 Sheets—Sheet 1.
C. H. VEEDER.
ELECTRO-MAGNETIC CLUTCH.
No. 439,213. Patented Oct. 28, 1890.
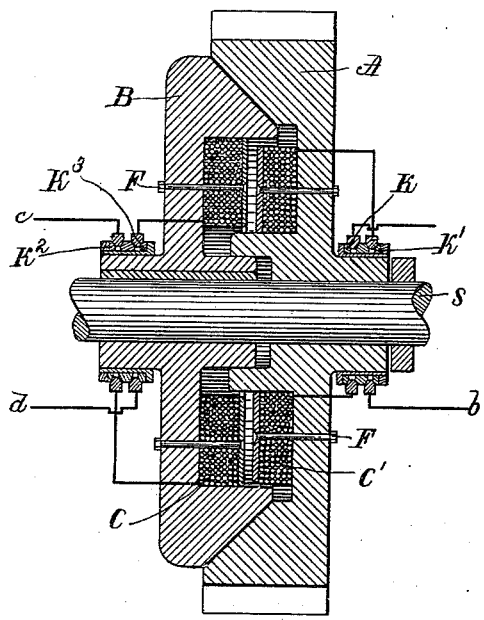
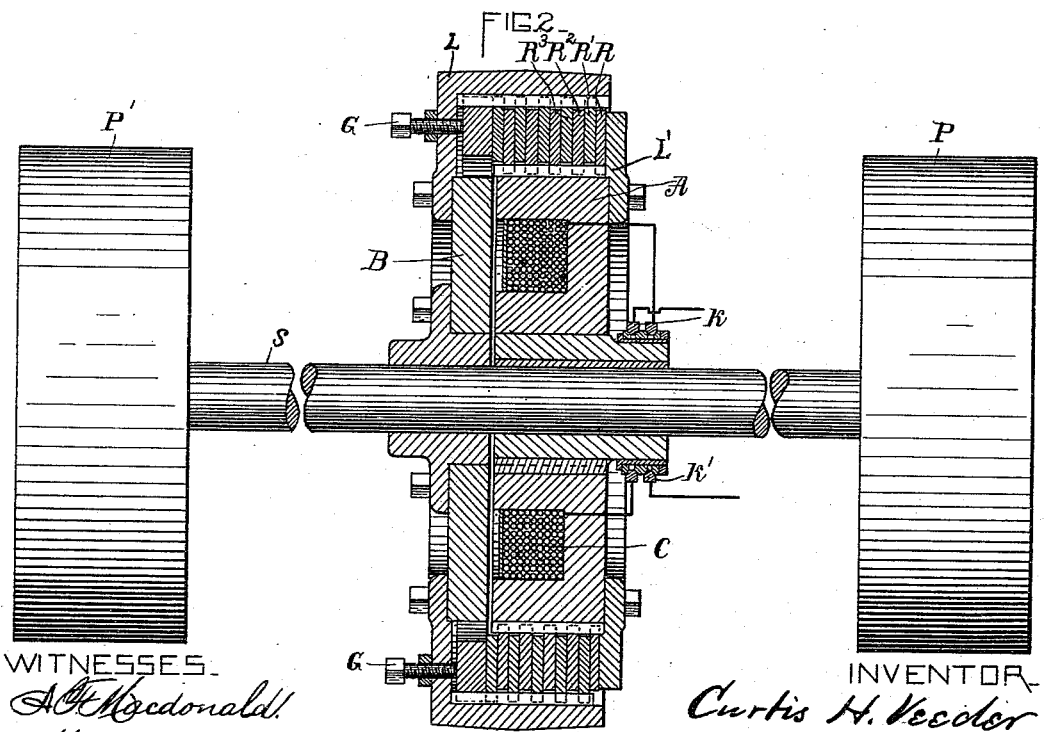
WITNESSES
A. H. Macdonald
W. M. Twombly
INVENTOR
Curtis H. Veeder
by Bentley & Knight
Attys.

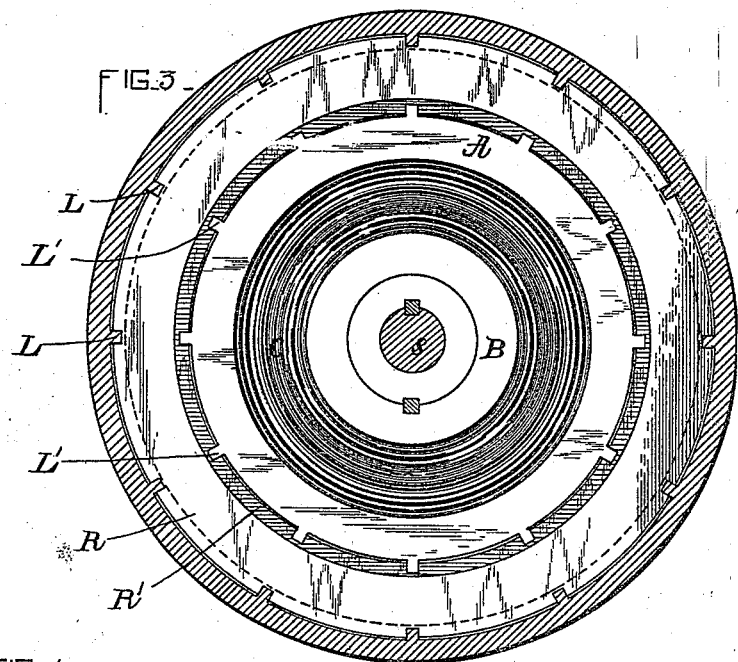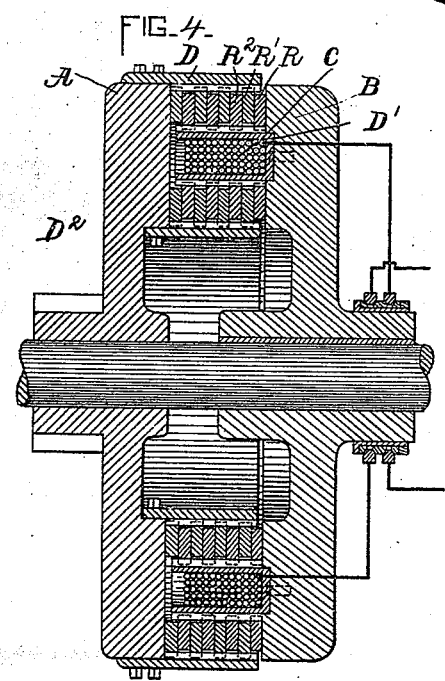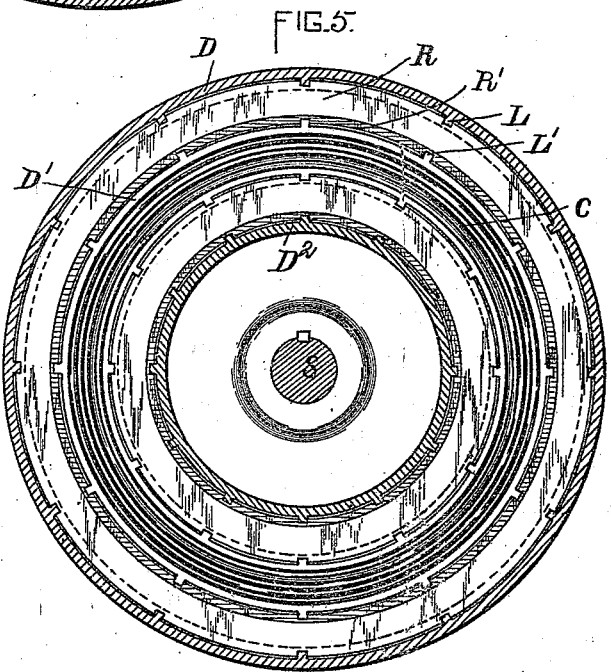

UNITED STATES PATENT OFFICE.

CURTIS HUSSEY VEEDER, OF LYNN, MASSACHUSETTS, ASSIGNOR TO THE THOMSON-HOUSTON ELECTRIC COMPANY, OF CONNECTICUT.

ELECTRO-MAGNETIC CLUTCH.

SPECIFICATION forming part of Letters Patent No. 439,213, dated October 28, 1890.

Application filed June 27, 1890. Serial No. 356,943. (No model.)

*To all whom it may concern:*

Be it known that I, CURTIS HUSSEY VEEDER, a citizen of the United States, residing at Lynn, county of Essex, State of Massachusetts, have invented a new and useful Improvement in Electro-Magnetic Clutches or Brakes, of which the following is a specification.

My invention relates to that class of devices in which the attractive force of electro-magnetism is utilized for causing the two parts of a brake, friction-clutch, or similar apparatus to bear upon each other with the proper amount of friction at the will of the operator. In the construction of such apparatus it is desirable that it shall be as compact as possible, and that all the energy exerted shall be applied in the most efficient manner to give the most powerful results.

My invention consists, first, of a clutch or brake mounted on a shaft and constructed in the form of a double cylinder similar to a Camacho magnet and a wire coil occupying the annular space between the two cylinders, the armature or piece to be attracted consisting either of a similar electro-magnet or of a disk adapted to be attracted axially by the before-mentioned magnet.

My invention further consists in combining such an attracting device with a number of friction-plates, so as to multiply the frictional effect, as hereinafter specified.

Figure 1 represents an axial section of an electro-magnetic brake in which each member is provided with an electric coil. Fig. 2 is an axial section of an electro-magnetic coupling for shafts constructed according to my invention. Fig. 3 is a section in a plane at right angles to that of Fig. 2. Fig. 4 is an axial section of a modified form. Fig. 5 is a section at right angles to that of Fig. 4.

In Fig. 1 the part B turns with the shaft S and the part A runs loosely upon the shaft. Magnetizing-coils C C' are retained in position in the hollow spaces of the parts A and B by bolts F. Collecting-rings K K' K² K³ are connected to the respective terminals of the coils C C' and have brushes bearing on them which are connected to a suitable source of current-supply. The rubbing portions of the parts A and B may be inclined at an angle of, say, forty-five degrees, as shown. By using two coils, as shown in Fig. 1, the separation of the two members of the clutch may be easily and promptly effected by reversing the current in one of the coils so as to substitute a repulsive for the attractive force.

In Fig. 2 the friction is not obtained directly between the magnet and its armature, but, as indicated, the part B is a short distance away from the magnet and the friction obtained by a number of friction-rings R R' R² R³, &c. Extending from the part B, or the loosely-mounted part, is a brass ring L, which has feathers or splines running across its inner face at given intervals. About its inner circumference and from the portion A, which is the portion secured to and revolving with the shaft, is a similar brass ring L', also provided with splines, which are placed oppositely to those on the ring L. One half of the rings, as R R² R⁴, &c., slide upon the splines of the ring L, and the other half, as R R³ R⁵, &c., slide upon the splines of the ring L', and when the coil C is energized these rings are forced firmly together and the friction is in this manner largely augmented because of the multiple bearing-surfaces. This construction has also the advantage that when the current is broken permanent magnetism or residual magnetism will not hold the parts A and B in firm contact, as would otherwise probably be the case. Adjusting-screws G are provided so that the wear of the rings may be compensated for.

In Fig. 4 the rings R R' R², &c., are arranged in a manner similar to Fig. 3; but in this instance the rings themselves form a part of the magnetic circuit about the coil C. This construction also possesses the advantage of quickly losing its magnetism when the current is discontinued in the coil C, because of the iron being divided into a number of planes transverse to the magnetic circuit.

Figs. 3 and 5 are side elevations of Figs. 2 and 4, respectively illustrating the position of the magnetizing-coil C, the rings R R' R², and the splines or feathers L L' L², &c., upon which the iron rings slide toward and from each other. The rings L L', &c., are made of non-metallic metal—such as brass—so that the magnetic rings R R', &c., will freely slide thereon.

It is evident that this apparatus may be used for many purposes. By mounting one of the parts upon an axle and holding the other part so that it cannot rotate, the apparatus will form an efficient and powerful brake. By mounting the two parts on the abutting ends of two shafts the device becomes a friction-clutch coupling, or one of the rotating parts may be fastened directly to a pulley while the other part is secured to the shaft when it is desired to use the invention in connection with friction-pulleys.

In Fig. 4, where the magnetic circuit is completed through the alternating rings, there will be an accumulative frictional effect due to the fact that the said rings not only are pressed together by the pressure of the end plates, but also by their own local magnetism.

It will be understood, of course, that any degree of pressure may be obtained up to the point of saturation by varying the strength of current in the coil. Moreover, the putting on or taking off of the clutch may be made as gradual as desired.

What I claim as new, and desire to secure by Letters Patent, is—

1. An electro-magnetic friction clutch or brake consisting of two electro-magnetic members mounted upon a shaft, one of said members being fast to the shaft while the other is free to rotate thereon, each member having an energizing-coil whereby they may be independently magnetized so as to either attract or repel.

2. An electro-magnetic friction clutch or brake consisting of two magnetic members mounted upon a shaft, one of the said members being fast to the shaft while the other is free to rotate and slide thereon, combined with two coils inclosed within said members and with insulated rings upon the shaft connected with said coils, and contact-brushes bearing upon the rings and communicating with an external source of electricity, so that the said coils may be used in conjunction or in opposition.

3. An electro-magnetic friction clutch or brake having two magnetic attracting members mounted upon a shaft, one of said members being fast to the shaft and the other free to rotate and slide thereon, combined with a series of friction-rings, some of said rings being secured to one member so as to move therewith and the rest of said rings being secured to the other member, the first set of rings alternating in position with those of the other set, the whole set of rings being placed between the two members, so as to be pressed together when the two members are attracted.

4. The combination, in an electro-magnetic brake, of two iron members mounted upon a shaft and provided with an energizing-coil, one fixed to the shaft and the other rotatable thereon, with one or more series of iron friction-rings interposed between the two members, so as to close the magnetic circuit between them, the planes of division between them being across magnetic lines of force, the said rings being alternately secured first to one member and then to the other, substantially as and for the purpose set forth.

CURTIS HUSSEY VEEDER.

Witnesses:
C. L. HAYNES,
W. M. WOMBLY.